United States Patent
Smith (10) Patent No.: US 10,743,522 B2
(45) Date of Patent: Aug. 18, 2020

(54) PET LEASH WITH DAMPENING EXTENSION MECHANISM

(71) Applicant: Tender Pet Products, Santa Ana, CA (US)

(72) Inventor: Gregory M. Smith, Newport Beach, CA (US)

(73) Assignee: Tender Pet Products, Santa Ana, CA (US)

( * ) Notice: Subject to any disclaimer, the term of this patent is extended or adjusted under 35 U.S.C. 154(b) by 447 days.

(21) Appl. No.: 15/659,497

(22) Filed: Jul. 25, 2017

(65) Prior Publication Data

US 2018/0027775 A1    Feb. 1, 2018

Related U.S. Application Data

(60) Provisional application No. 62/368,751, filed on Jul. 29, 2016.

(51) Int. Cl.
*A01K 27/00*     (2006.01)
*B65H 75/44*     (2006.01)

(52) U.S. Cl.
CPC ....... *A01K 27/004* (2013.01); *B65H 75/4431* (2013.01); *B65H 75/4471* (2013.01); *B65H 2701/35* (2013.01); *B65H 2701/37* (2013.01)

(58) Field of Classification Search
CPC ...... A01K 27/004; A01K 27/003; A01K 1/04; A01K 27/005; A01K 27/00; A01K 27/009; A01K 27/001
USPC ................................ 119/795, 794, 797, 792
See application file for complete search history.

(56) References Cited

U.S. PATENT DOCUMENTS

| | | | |
|---|---|---|---|
| 4,488,511 A | 12/1984 | Grassano et al. | |
| 5,732,662 A | 3/1998 | Jacobsen et al. | |
| 6,845,736 B1 | 1/2005 | Anderson | |
| 6,935,277 B2 | 8/2005 | Vaccari | |
| 7,036,459 B1 | 5/2006 | Mugford et al. | |
| 8,251,020 B2 | 8/2012 | Matthews | |
| 8,695,537 B2 | 4/2014 | Bizzell et al. | |
| 2004/0237906 A1* | 12/2004 | Waxman | A01K 27/004 119/796 |

(Continued)

FOREIGN PATENT DOCUMENTS

| | | |
|---|---|---|
| GB | 2481403 | 12/2011 |
| WO | 2015008222 | 1/2015 |

*Primary Examiner* — Peter M Poon
*Assistant Examiner* — Jeffrey R Larsen
(74) *Attorney, Agent, or Firm* — Stetina Brunda Garred and Brucker (57) ABSTRACT

A leash including a housing, a reel assembly rotatably coupled to the housing, and a tether coupled to the reel assembly. The reel assembly includes a tether wheel coupled to the tether, and rotatable relative to the housing in a first rotational direction to effectuate extension of the tether, and rotatable in a second rotational direction to effectuate retraction of the tether. A hard stop gear is coupled to the tether wheel, and a soft stop gear is rotatably coupled to the hard stop gear. A dampening spring is coupled to the soft stop gear and the hard stop gear to impart a biasing force on the soft stop gear as it rotates relative to the hard stop gear. A soft stop lever is operatively coupled to the soft stop gear and is configured to selectively restrict rotation of the soft stop gear relative to the housing.

18 Claims, 8 Drawing Sheets

(56) References Cited

U.S. PATENT DOCUMENTS

2006/0162675 A1\* 7/2006 Ghalebi .............. A01K 27/004
   119/796
2011/0180017 A1 7/2011 Goldenberg
2012/0205479 A1\* 8/2012 Wang ................... A01K 27/004
   242/396.4

\* cited by examiner

PET LEASH WITH DAMPENING EXTENSION MECHANISM

CROSS-REFERENCE TO RELATED APPLICATIONS

This application claims the benefit of U.S. Provisional Application No. 62/368,751, filed Jul. 29, 2016, the contents of which are expressly incorporated herein by reference.

STATEMENT RE: FEDERALLY SPONSORED RESEARCH/DEVELOPMENT

Not Applicable

BACKGROUND

1. Technical Field

The present disclosure relates generally to leashes, and more specifically to leashes having a selectively adjustable length with a dampening extension mechanism to allow for a gentle extension stop.

2. Description of the Related Art

Leashes are well known devices which are commonly used with dogs or other pets to maintain a degree of restraint or control over the pet. Oftentimes, the leash will clip on to a collar or harness worn by the pet, while the other end of the leash is held by a human user. The leash provides the pet with a limited amount of freedom, while giving the human user control over the pet. For instance, a leash is oftentimes used when the pet owner takes the pet for a walk in a public location. Along these lines, many cities and municipalities have passed legislation requiring dogs to be on leashes in public areas.

Certain leashes are very simple and include a fixed length of material, such as woven fabric. Such fixed length leashes are suitable to maintain control over the pet, although they lack widespread appeal due to the lack of adjustability in length. Indeed, in certain situations, it may be desirable to keep the pet on a short leash, while in other instances, it may be desirable to let the pet have a longer leash.

Therefore, certain adjustable leashes have been developed, which provide the user with the ability to shorten or lengthen the leash during use. Oftentimes, the leashes include a tether coupled to the main housing, wherein the tether may extend out of the main housing as the distance between the pet and the user holding the main housing increases, while the leash is retracted into the main housing as the distance between the pet and the user decreases. If the user decides to limit further extension or retraction of the tether, the leash typically includes a stop button or other actuator that the user may depress to restrict further extension or retraction of the tether relative to the main housing.

Although conventional adjustable leashes provide certain benefits relative to fixed length leashes, the adjustability of the leash may introduce certain drawbacks. For instance, although many conventional adjustable leashes provide the user with the ability control the length of the tether extending out of the main housing, such control is oftentimes associated with a "hard stop." In other words, when the user actuates the stop button, the length of the tether is abruptly fixed, e.g., prevented from further adjustment, which may cause harm to the pet or the user. Along these lines, the pet may sustain various injuries if the pet is running when the user actuates stop button. Furthermore, the user may injure his hand, arm or shoulder if extension of the leash is abruptly stopped.

Accordingly, there is a need in the art for an improved pet leash that is capable of providing a dampening force when extension of the leash is restricted. Various aspects of the present disclosure address this particular need, as will be discussed in more detail below.

BRIEF SUMMARY

In accordance with one embodiment of the present disclosure, there is provided a retractable, adjustable length leash having a damping extension mechanism which is selectively actuatable by the user to impart a dampening force when the user decides to stop extension of the leash. In this regard, when the dampening extension mechanism is actuated, the leash may be extendable by a certain amount, albeit with an increased resistance in the leash. The dampening extension mechanism allows the leash to come to a "soft stop" when extension is stopped, rather than a "hard stop" associated with conventional retractable leashes. Thus, the dampening extension mechanism provides a safer and more comfortable alternative to conventional retractable leashes.

It is contemplated that the dampening mechanism may be manually actuated by the user at any position prior to full extension and/or automatically actuated in response to the leash nearing its fully extended configuration.

According to one embodiment, the leash includes a main housing defining an enclosure, and a reel assembly rotatably coupled to the main housing and located within the enclosure. A tether is coupled to the reel assembly and is capable of extension out of the main housing, and retraction into the main housing. The reel assembly includes a tether wheel coupled to the tether, with the tether wheel being rotatable relative to the main housing in a first rotational direction to effectuate extension of the tether, and rotatable in a second rotational direction to effectuate retraction of the tether. A hard stop gear is coupled to the tether wheel, and a soft stop gear is rotatably coupled to the hard stop gear. A dampening spring is coupled to the soft stop gear and the hard stop gear to impart a biasing force on the soft stop gear in response to relative rotation of the soft stop gear and the hard stop gear. A soft stop lever is operatively coupled to the soft stop gear and is configured to selectively restrict rotation of the soft stop gear relative to the main housing and may be selectively locked into position by the user.

The leash may further include a soft stop pawl providing the operative interconnection between the soft stop lever and the soft stop gear, with the soft stop pawl being selectively engageable with teeth on the soft stop gear.

The leash may further include a hard stop lever operatively coupled to the hard stop gear and configured to selectively restrict rotation of the hard stop gear relative to the main housing and may be selectively locked into position by the user. A hard stop pawl may be incorporated into the leash to provide the operative interconnection between the hard stop lever and the hard stop gear, with the hard stop pawl being selectively engageable with teeth on the hard stop gear.

The leash may also include a retraction spring coupled to the main housing and the tether wheel to bias the tether wheel toward a retracted position in response to rotation of the tether wheel during extension of the tether.

According to one embodiment, there is provided a retractable leash for a pet, with the retractable leash comprising a main housing defining an enclosure. A tether is selectively extendable from the main housing in a first operational mode and retractable into the main housing in a second operational mode. A reel assembly is coupled to the main housing and is located within the enclosure. The reel assembly includes a tether wheel coupled to the tether, and rotatable relative to the main housing in a first rotational direction to effectuate extension of the tether, and rotatable in a second rotational direction to effectuate retraction of the tether. A hard stop gear is coupled to the tether wheel, and a soft stop gear is rotatably coupled to the hard stop gear. A dampening spring is coupled to the soft stop gear and the hard stop gear, with the dampening spring imparting a biasing force on the soft stop gear in response to rotation of the soft stop gear relative to the hard stop gear.

The soft stop gear may be mounted to the hard stop gear, with at least a portion of the hard stop gear being located between the soft stop gear and the tether wheel. The hard stop gear may include a first set of teeth and the soft stop gear may include a second set of teeth fewer in number than the first set of teeth.

The retractable leash may additionally include a soft stop pawl selectively transitional relative to the soft stop gear between a first position and a second position, with the soft stop pawl being disengaged with the soft stop gear in the first position and engaged with the soft stop gear in the second position to restrict rotation of the soft stop gear relative to the main housing. The retractable leash may further comprise a soft stop lever connected to the main housing and operatively associated with the soft stop pawl, movement of the soft stop lever relative to the main housing facilitating movement of the soft stop pawl between the first position and the second position. A spring may be coupled to the soft stop pawl and operative to bias the soft stop pawl toward the first position.

A hard stop pawl may be selectively transitional relative to the hard stop gear between a first position and a second position, the hard stop pawl being disengaged with the hard stop gear in the first position and engaged with the hard stop gear in the second position to restrict rotation of the hard stop gear relative to the main housing. A hard stop lever may be connected to the main housing and operatively associated with the hard stop pawl, movement of the hard stop lever relative to the main housing facilitating movement of the hard stop pawl between the first position and the second position. A spring may be coupled to the hard stop pawl and operative to bias the hard stop pawl toward the first position.

A retraction spring may be coupled to the main housing and the tether wheel to impart a biasing force on the tether wheel in response to rotation of the tether wheel in the first rotational direction.

The retractable leash may include a follower connected to the main housing, the follower being structured and positioned to interface with the tether. The follower may be moveable relative to the main housing in response to extension and retraction of the tether relative to the main housing. A follower pawl may be operatively coupled to the follower, the follower pawl being transitional between a first position, wherein the follower pawl is engaged with the soft stop gear, and a second position, wherein the follower pawl is disengaged with the soft stop gear, the follower pawl transitioning between the first position and the second position based upon a position of the follower relative to the main housing. A spring may extend between the follower and the follower pawl.

According to another embodiment, there is provided a retractable leash comprising a housing and a tether extendable from the housing in a first operational mode and retractable toward the housing in a second operational mode. A tether wheel is coupled to the tether, and is rotatable relative to the housing in a first rotational direction to effectuate extension of the tether, and rotatable in a second rotational direction to effectuate retraction of the tether. A set of hard stop teeth is coupled to the tether wheel, and a set of soft stop teeth is moveably coupled to the set of hard stop teeth. A dampening spring is coupled to the soft stop teeth and the hard stop teeth, the dampening spring imparting a biasing force on the soft stop teeth in response to movement of the set of soft stop teeth relative to the set of hard stop teeth.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

The detailed description set forth below in connection with the appended drawings is intended as a description of certain embodiments of a pet leash having a dampening extension mechanism and is not intended to represent the only forms that may be developed or utilized. The description sets forth the various structure and/or functions in connection with the illustrated embodiments, but it is to be understood, however, that the same or equivalent structure and/or functions may be accomplished by different embodiments that are also intended to be encompassed within the scope of the present disclosure. It is further understood that the use of relational terms such as first and second, and the like are used solely to distinguish one entity from another without necessarily requiring or implying any actual such relationship or order between such entities.

Referring now to the drawings, wherein the showings are for purposes of illustrating a preferred embodiment of the present disclosure, and are not for purposes of limiting the same, there is depicted a dog leash 10 having a main housing 12 and an extendable/retractable tether 14 which is specifically configured and adapted to provide a "soft stop" when the user desires to stop extension of the tether 14 out of the main housing 12. In this regard, when the user desires to stop extension, a dampening force is applied to the tether 14 to allow for further extension thereof, albeit with increased resistance. As such, the leash 10 is more gentle, more comfortable, and safer for both the dog and the human user, when compared to conventional extendable leashes that include a "hard stop."

According to one embodiment, the main housing 12 is formed of two housing bodies, namely a first housing body 16 and a second housing body 18 that is cooperatively engageable with the first housing body 16. The first and second housing bodies 16, 18 are each configured to collectively define a housing cavity, which is adapted to receive a reel assembly 20, which will be described in more detail below.

Figure 3:
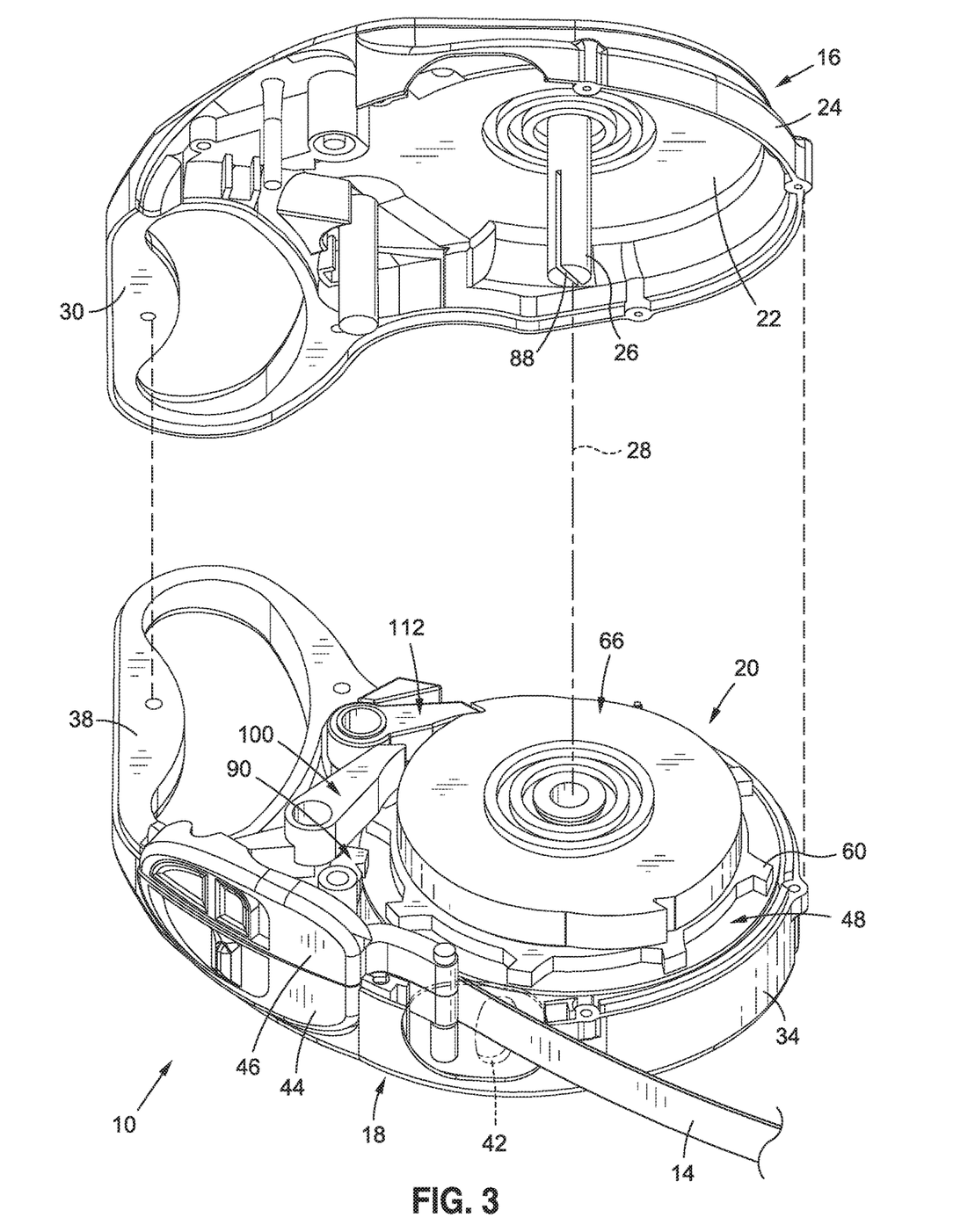
FIG. 3 is a partial exploded perspective view of the dog leash as viewed from a first side.
Figure 4:
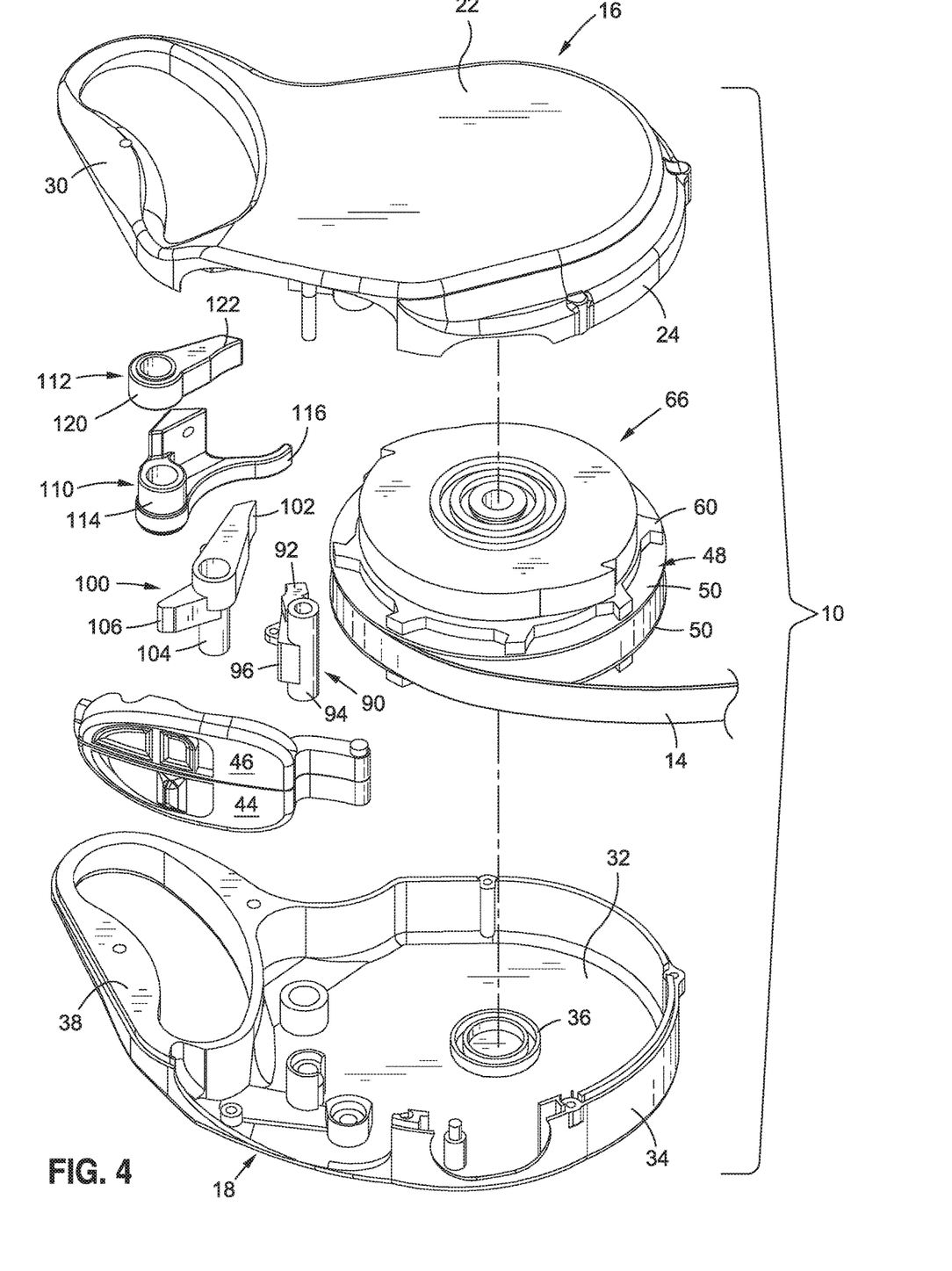
FIG. 4 is a partial exploded perspective view of the dog leash as viewed from a second side.

The first housing body 16 includes a first end wall 22 and a first peripheral wall 24 extending from the first end wall 22. The first peripheral wall 24 may include a step portion to facilitate mating engagement with the second housing body 18. A post 26 extends generally perpendicularly from the first end wall 22 in spaced relation to the first peripheral wall 24, and defines an axis 28 about which the reel assembly 20 rotates, as will be described in more detail below. Several additional posts or structures may also extend from the first end wall 22, with such structures being adapted to align and engage the second housing body 18 or other internal components located within the main housing 12. The first housing body 16 additionally includes a first handle portion 30, which is at least partially defined by a segment of the first peripheral wall 24.

The second housing body 18 includes a second end wall 32 and a second peripheral wall 34 extending from the second end wall 32. The second housing body 18 includes one or more bosses 36 extending from the second end wall 32 to locate the reel assembly 20 relative to the second end wall 32. Several additional structures may also extend from the second end wall 32, with such structures being adapted to align and engage the first housing body 16 or other internal components located within the main housing 12. The second housing body 18 additionally includes a second handle portion 38, which is at least partially defined by a segment of the second peripheral wall 34.

The contour of the first peripheral wall 24 is complimentary to the contour of the second peripheral wall 34, such that the first and second housing bodies 16, 18 may be cooperatively engaged with each other to define the main housing 12. When the first and second housing bodies 16, 18 are engaged with each other, the first and second handle portions 30, 38 collectively define a handle which the user may grasp, and a handle opening, through which the user may extend his or her hand when gripping the main housing 12.

The housing bodies 16, 18 may be formed via injection molding, with a polymer material, although other manufacturing techniques and materials known in the art may also be used.

Figure 1:
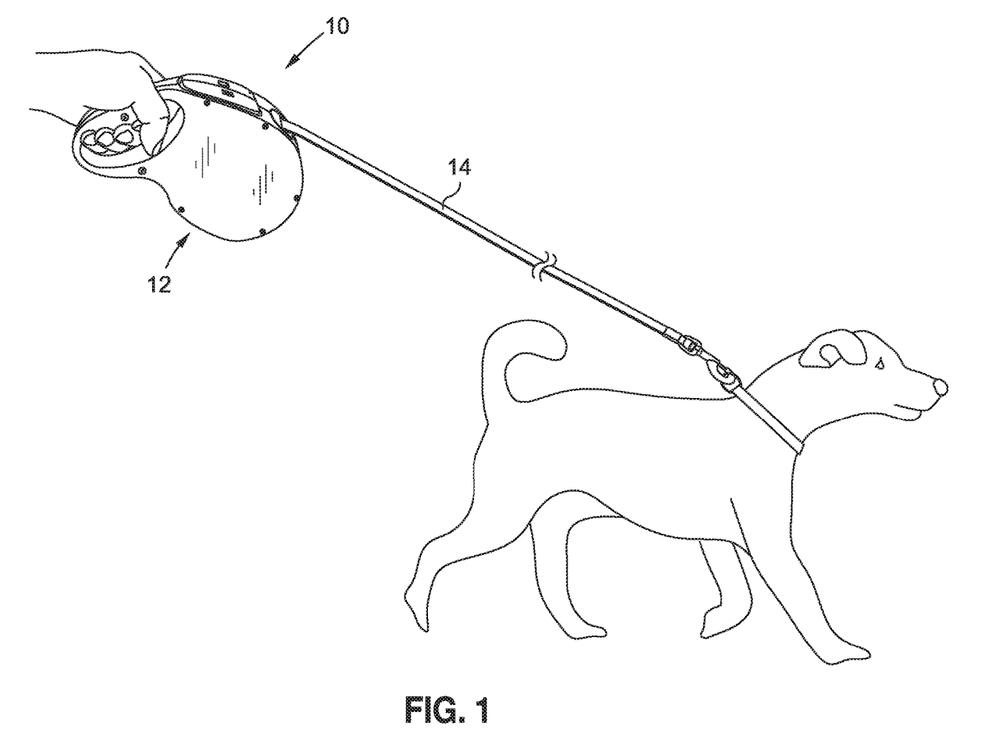
FIG. 1 is an upper perspective view of a retractable dog leash being held by a user and attached to a dog collar worn by a dog.
Figure 2:
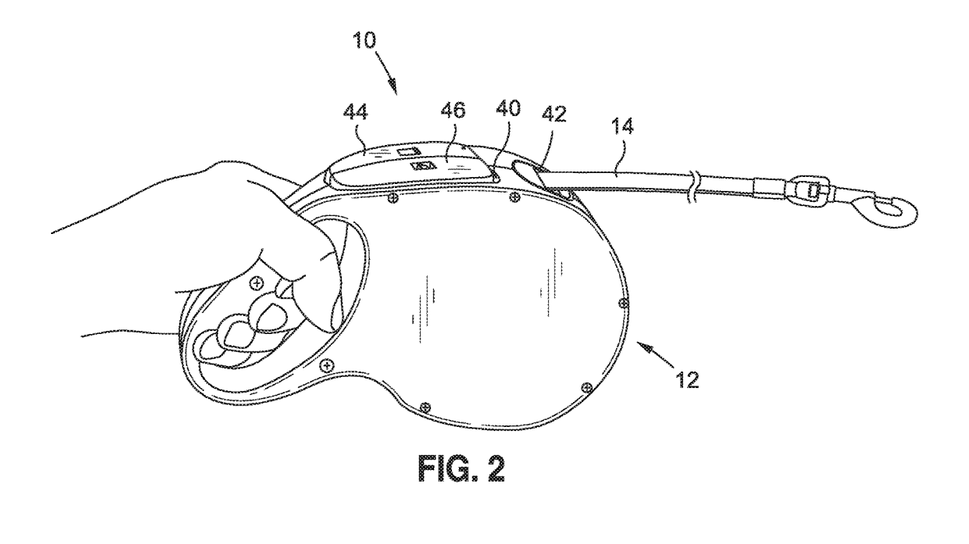
FIG. 2 is an upper perspective view of the dog leash.

The main housing 12 further includes a lever opening 40 and a leash opening 42, which are both collectively defined by the first and second housing bodies 16, 18. The lever opening 40 is adapted to expose portions of a hard stop lever 44 and a soft stop lever 46 to enable a user to selectively actuate the hard stop and soft stop levers 44, 46. According to one embodiment, each lever 44, 46 coupled to the main housing 12 and is independently pivotable relative to the main housing 12 between a released position and a depressed position, wherein each lever 44, 46 is pressed into the main housing 12 as each lever 44, 46 transitions from the released position toward the depressed position. As will be explained in more detail below, the hard stop lever 44 is configured to be actuated by the user to create a "hard stop," e.g., prevent substantially immediate further extension of the tether 14 out of the main housing 12 when actuated, while the soft stop lever 46 is configured to be actuated by the user to create a "soft stop," e.g., to allow further extension of the tether 14 out of the main housing 12 with increased resistance when actuated.

Figure 5:
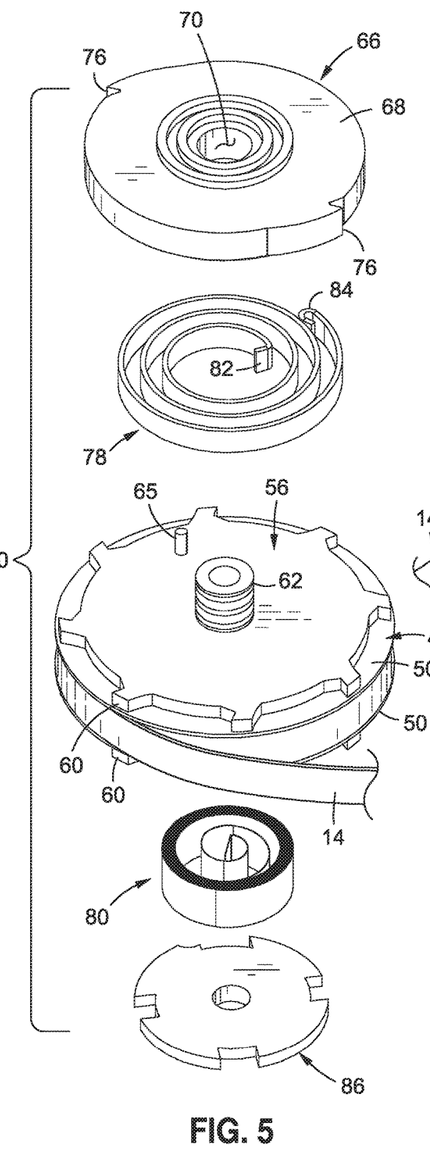
FIG. 5 is a partial exploded upper perspective view of a reel assembly used in the leash.
Figure 6:
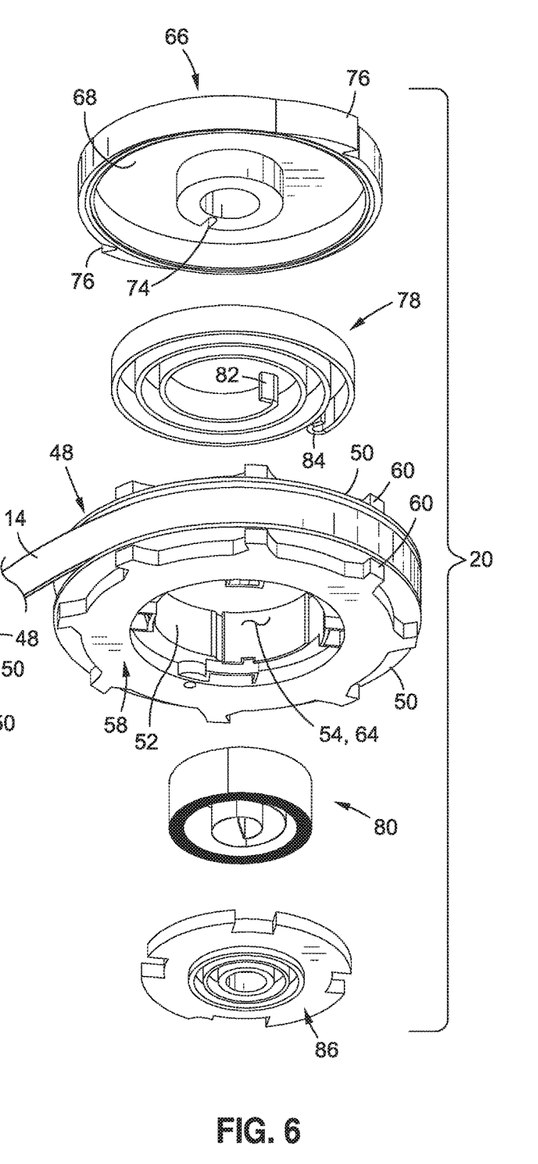
FIG. 6 is a partial exploded lower perspective view of the reel assembly used in the leash.

Turning now to the internal components, the leash 10 includes the reel assembly 20, as well as a plurality of pawls and springs, which are located in the housing cavity. The reel assembly 20 includes a plurality of interconnected components which are configured to rotate about the axis 28 as the tether 14 is extended or retracted relative to the main housing 12. Along these lines, the reel assembly 20 includes a tether wheel 48 having a pair of annular walls 50 spaced from each other, and interconnected via an inner cylindrical wall 52, which defines a tether wheel opening 54. The pair of annular walls 50 collectively define a channel therebetween which is sized to accommodate the tether 14. In particular, the tether 14 includes a first end portion that is connected to the tether wheel 48 and a second end portion attached to dog collar or other hardware intended to be attached to the dog. The tether 14 and tether wheel 48 are collectively configured to allow the tether 14 to be wrapped around the tether wheel 48 and within the channel as the tether wheel 48 rotates in a first direction, with the tether 14 being unwrapped from the tether wheel 48 as the tether wheel 48 rotates in an opposing second direction. In this regard, the width of the channel generally corresponds to the width of the tether 14, and the depth of the channel is sufficient to receive the tether 14 when the tether 14 is completely retracted. When the tether 14 is unwrapped from the tether wheel 48, the tether 14 is released or let out from the tether wheel 48, with the tether 14 defining an exposed segment as that portion of the tether 14 extending out of the main housing 12. In this regard, rotation of the tether wheel 48 in the second direction results in lengthening of the exposed segment, while rotation in the first direction results in shortening of the exposed segment.

The reel assembly 20 additionally includes a pair of hard stop gears 56, 58 extending along an outer surface of a respective annular wall 50. Each hard stop gear 56, 58 includes a plurality of teeth 60 (i.e., a set of hard stop teeth) extending radially outward from a central region. According to one embodiment, the hard stop gears 56, 58 include an equal number of teeth 60, which are generally aligned with each other. In other words, the teeth 60 on one hard stop gear are located at the same circumferential location as the teeth 60 on the other hard stop gear. In the exemplary embodiment, each hard stop gear 56, 58 includes eight teeth, although the number of teeth 60 may vary without departing from the spirit and scope of the present disclosure. The central region of the hard stop gears 56, 58 slightly differ. In particular, one of the hard stop gears 56 includes a central boss 62 coupled thereto, while the other hard stop gear 58 includes a central opening 64 aligned with the tether wheel opening 54.

The reel assembly 20 further includes a soft stop gear 66 coupled to the hard stop gear 56. In particular, the soft stop gear 66 includes an end wall 68 disposed about a central opening 70 which receives the central boss 62 to properly align the soft stop gear 66 relative to the hard stop gear 56. The soft stop gear 66 is coupled to the hard stop gear 56 in a manner which allows for at least a certain degree or amount of rotation of the soft stop gear 66 relative to the hard stop gear 56. Extending axially from the end wall 68 around the central opening 70 is a cylindrical wall 72 having a cutout 74 formed therein, the purpose of which will be described in more detail below. The exemplary soft stop gear 66 includes two diametrically opposed teeth 76 (i.e., a set of soft stop teeth), although additional teeth may be included without departing from the spirit and scope of the present disclosure. In the exemplary embodiment, the soft stop gear 66 includes fewer teeth than the hard stop gears 56, 58. The soft stop gear 66 defines an outer diameter that is substantially equal to the outer diameters of the hard stop gears 56, 58, although the teeth 60 on the hard stop gears 56, 58 may extend radially outward beyond the teeth 76 on the soft stop gear 66.

The reel assembly 20 includes two spiral springs for imparting a rotational bias on certain components thereof. In particular, one of the spiral springs 78 is a rotational dampening spring, and the other spiral spring 80 is a retraction spring. The dampening spring 78 is located in a space or cavity defined by the hard stop gear 56 and the soft stop gear 66. In particular, the dampening spring 78 includes a first bent end portion 82 and a second bent end portion 84. The first bent end portion 82 is located at the radial inside of the dampening spring 78 and is configured to be received within the cutout 74 formed in the cylindrical wall of the soft stop gear 66. The second bent end portion 84 is configured to extend around a post 65 or other structure coupled to the hard stop gear 56. In this regard, one end portion of the dampening spring 78 is coupled to the hard stop gear 56, while the other end portion of the dampening spring 78 is coupled to the soft stop gear 66. Thus, as the soft stop gear 66 rotates relative to the hard stop gear 56 from a rest position, the tension in the dampening spring increases. As will be explained in more detail below, the ability of the soft stop gear 66 to rotate relative to the hard stop gear 56, albeit with increased resistance being applied by the dampening spring 78, allows the tether 14 to be extended out of the main housing 12, with increased resistance being applied to the tether 14 by the dampening spring 78, thereby resulting in a soft stop.

The retraction spring 80 is located within the tether wheel opening 54, and includes a first end portion coupled to the tether wheel 48 and a second end portion coupled to the main housing 12. The retraction spring 80 is captured within the tether wheel opening 54 between the hard stop gear 56 and a cover plate 86 which connects to the other hard stop gear 58. According to one embodiment, the retraction spring 80 is coupled to the tether wheel 48 via insertion of an end portion of the retraction spring within a slot (not shown) formed within the tether wheel 48, although other attachment mechanisms known in the art may also be employed. Likewise, the retraction spring 80 is coupled to the main housing 12 via insertion of an opposite end portion of the retraction spring 80 within a slot formed in the main housing 12. For instance, slot 88 formed on the central post 26 may receive an end portion of the retraction spring 80. Since opposite ends of the retraction spring 80 are coupled to the main housing 12 and the tether wheel 48, as the tether wheel 48 rotates in a first direction relative to the main housing 12 from a rest position, the tension in the retraction spring increases, and thus, biases the tether wheel 48 toward rotation in an opposing second direction, which results in retraction of the tether 14 when the biasing force is not overcome.

Figures 7, 7A:
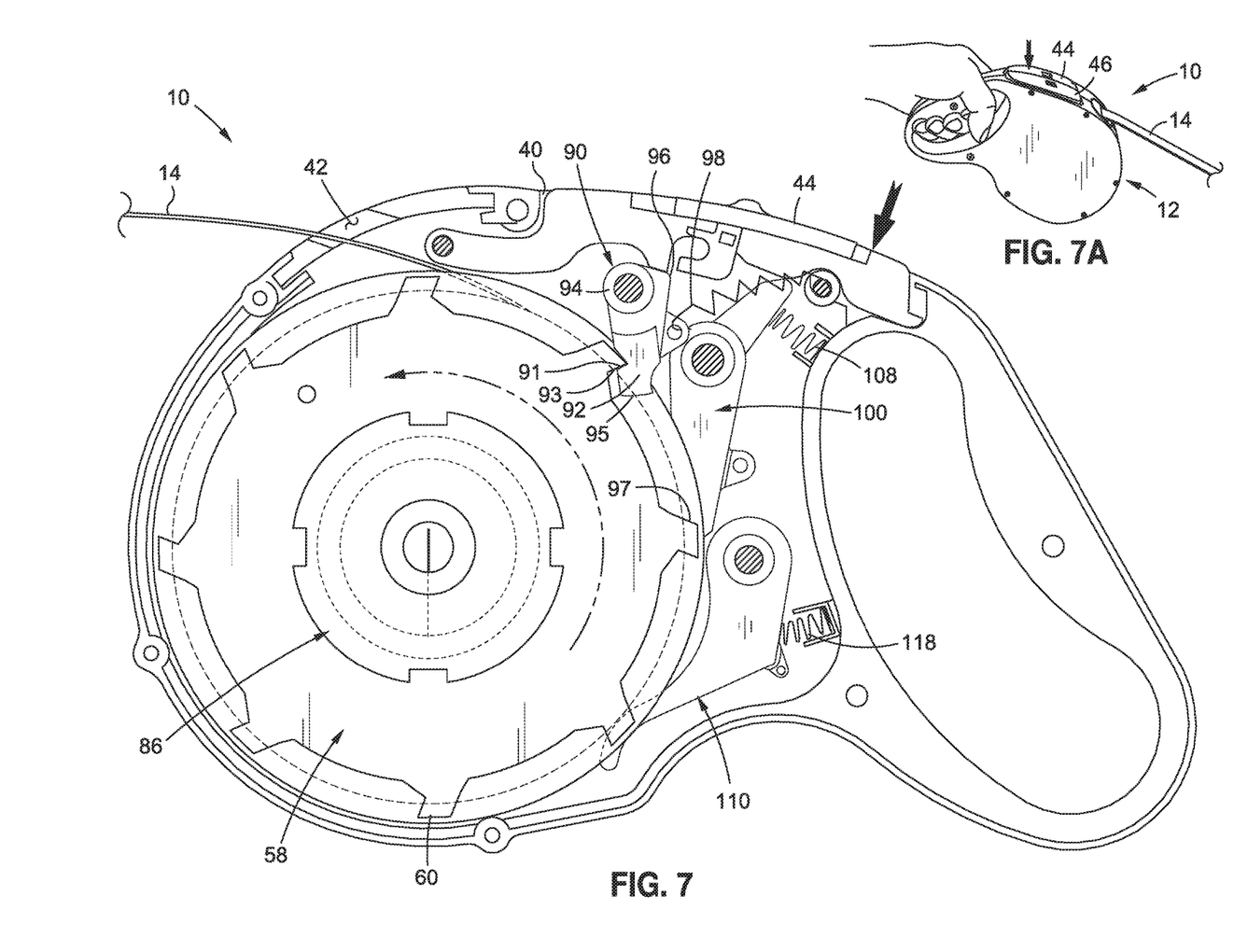
FIG. 7A is an upper perspective view of the leash indicating actuation of a hard stop lever.
FIG. 7 is a cross sectional view of the leash shown in FIG. 7A, with a hard stop pawl engaged with a hard stop gear to prohibit retraction of the leash.
Figure 7B:
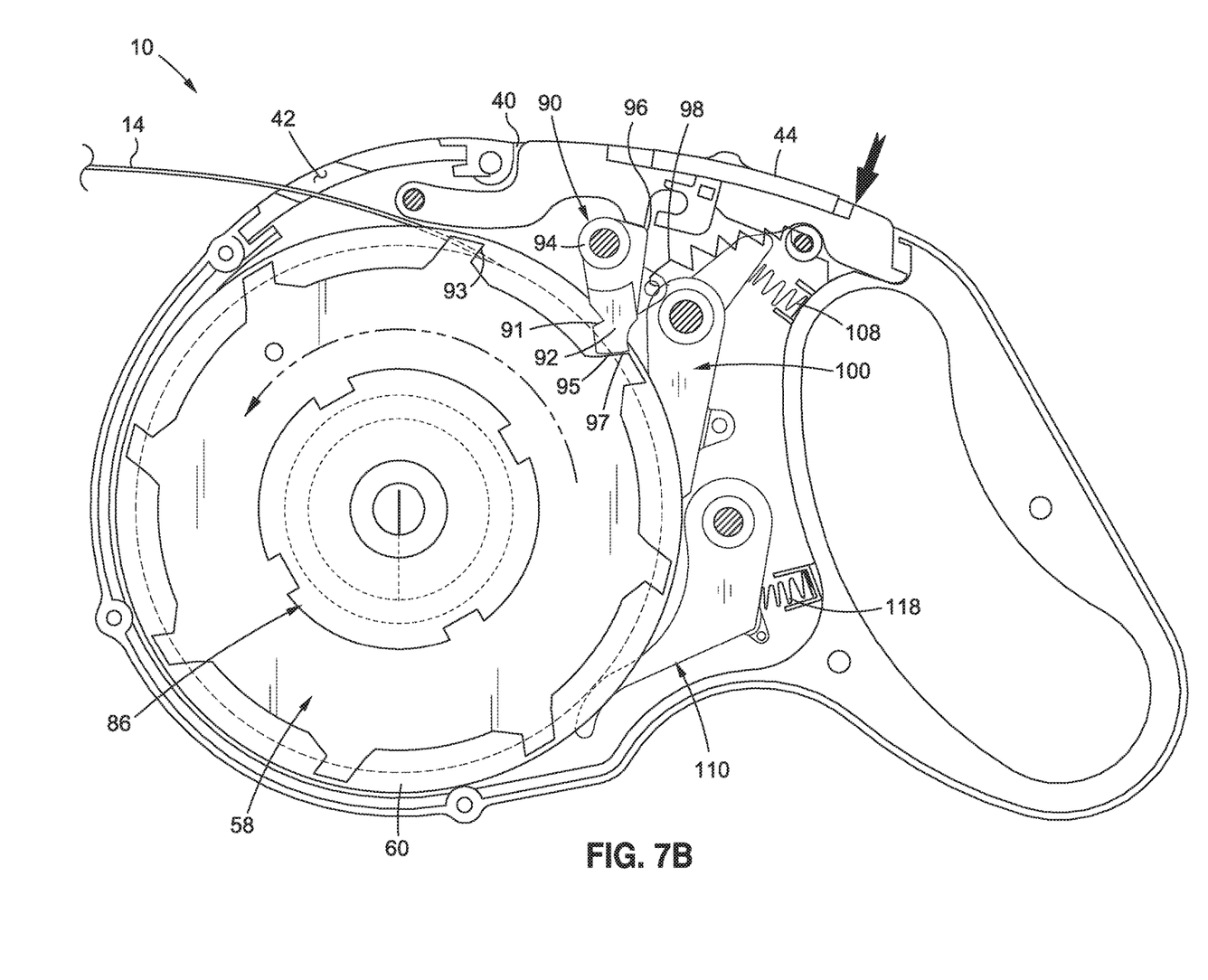
FIG. 7B is a cross sectional view of the leash shown in FIG. 7A, with the hard stop pawl engaged with the hard stop gear to prohibit extension of the leash.

The reel assembly 20 is designed to operatively engage with several pawls to implement the desired functionality of the leash 10. In particular, and referring now specifically to FIGS. 7, 7A and 7B, a hard stop pawl 90 is pivotally coupled to the main housing 12, and is configured to operatively engage with the pair of hard stop gears 56, 58, as well as the hard stop lever 44. The hard stop pawl 90 includes a pair of pawl arms 92 that engage teeth 60 on respective ones of the hard stop gears 56, 58. The pair of pawl arms 92 are connected to a pawl shaft 94 and a hard stop camming surface 96 which interfaces with the hard stop lever 44. The hard stop pawl 90 is pivotable between a disengaged position and an engaged position, with the pawl arms 92 being located within the rotational path of the teeth 60 of the hard stop gears 56, 58 when the hard stop pawl 90 is in the engaged position, and spaced from the rotational path of the teeth 60 of the hard stop gears 56, 58 when the hard stop pawl 90 is in the disengaged position. In particular, the pawl arm 92 includes retraction stop surface 91 adapted to engaged with edge 93 of tooth 60 to stop retraction of the tether 14. Furthermore, the pawl arm 92 includes extension stop surface 95 adapted to engage with edge 97 of tooth 60 to stop extension of the tether 14. A spring 98 is coupled to the hard stop pawl 90 and the main housing 12, with the spring 98 being configured to bias the hard stop pawl 90 toward the disengaged position, such that a user is required to press on the hard stop lever 44 to overcome the biasing force of the spring 98 and transition the hard stop pawl 90 to the engaged position. The pawl arms 92 and the teeth 60 of the hard stop gears 56, 58 are configured to substantially restrict further rotation of the reel assembly 20 once the hard stop pawl 90 is transitioned into the engaged position. In other words, when the reel assembly 20 is rotated in a first rotational direction when the tether 14 is extended out of the main housing 12, the hard stop pawl 90 may be transitioned to the engaged position, as shown in FIG. 7B, with pawl surface 95 contacting tooth surface 97 to prevent further rotation of the reel assembly 20 in the first direction. Likewise, when the reel assembly 20 is rotated in an opposing second rotational direction when the tether 14 is retracted into the main housing 12, the hard stop pawl 90 may be transitioned to the engaged position, as shown in FIG. 7A, with pawl surface 91 contacting tooth surface 93 to prevent further rotation of the reel assembly 20 in the second direction.

Figures 8, 8A:
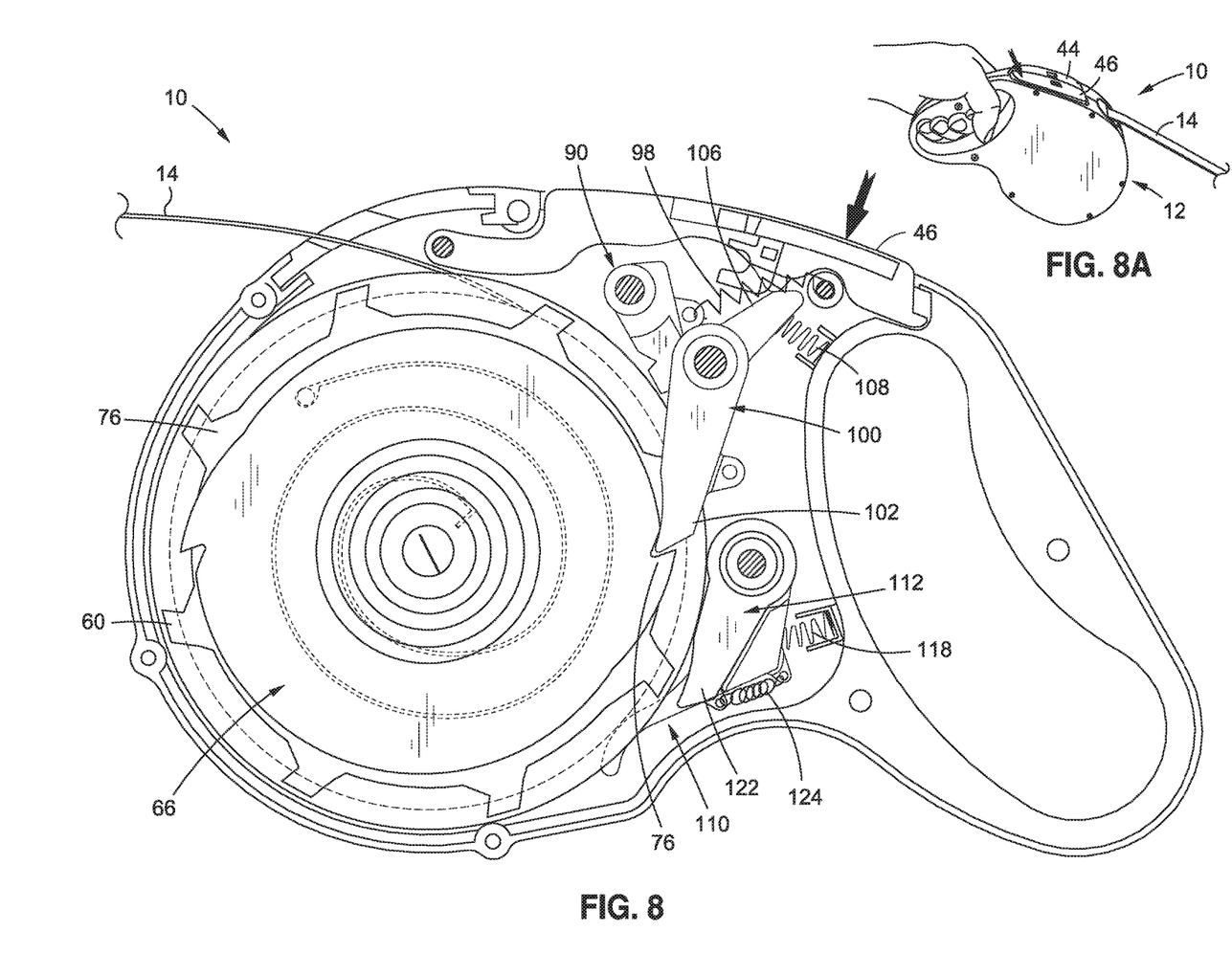
FIG. 8A is an upper perspective view of the leash indicating actuation of a soft stop lever.
FIG. 8 is a cross sectional view of the leash shown in FIG. 8A, with a soft stop pawl engaged with a soft stop gear.

Referring now specifically to FIG. 8, a soft stop pawl 100 is pivotally coupled to the main housing 12, and is configured to operatively engage with the soft stop gear 66, as well as the soft stop lever 46. The soft stop pawl 100 includes a pawl arm 102 that engages with teeth 76 on the soft stop gear 66. The pawl arm 102 is connected to a pawl shaft 104 and a soft stop camming surface 106 which engages with the soft stop lever 46. The soft stop pawl 100 is pivotable between a disengaged position and an engaged position, with the pawl arm 102 being located within the rotational path of the teeth 76 of the soft stop gear 66 when the soft stop pawl 100 is in the engaged position, and spaced from the rotational path of the teeth 76 of the soft stop gear 66 when the soft stop pawl 100 is in the disengaged position. A spring 108 is coupled to the soft stop pawl 100 and the main housing 12, with the spring 108 being configured to bias the soft stop pawl 100 toward the disengaged position, such that a user is required to press on the soft stop lever 46 to overcome the biasing force of the spring 108 and transition the soft stop pawl 100 to the engaged position. The pawl arm 102 and the teeth 76 of the soft stop gear 66 are configured to substantially restrict further rotation of the soft stop gear 66 relative to the main housing 12 once the soft stop pawl 100 is transitioned into the engaged position and the soft stop gear 66 rotates into engagement with the soft stop pawl 100. However, the tether 14 may continue to be let out of the main housing 12, since the tether wheel 48 is rotatable relative to the soft stop gear 66. In other words, stopping the rotation of the soft stop gear 66 relative to the main housing 12 does not solely prevent further extension of the tether 14 from the main housing 12. Rather, when the soft stop gear 66 is prevented from rotation, the dampening spring 78 is actuated (i.e., the tension is increased), such that there is increased rotational tension between the soft stop gear 66 and the tether wheel 48, with the magnitude of the rotational tension increasing as the tether wheel 48 continues to rotate relative to the soft stop gear 66.

The hard stop pawl 90 and soft stop pawl 100 described above are specifically configured to allow the user control over the length of the exposed portion of the tether 14 during use of the leash 10. In addition, various embodiments of the leash 10 also include components which are not directly controllable by the user, and instead are configured to operate automatically in conjunction with the tether 14, the tether wheel 48, and the soft stop gear 66. More specifically, and referring now specifically to FIG. 9, the leash 10 includes a follower 110 and a corresponding follower pawl 112, both of which are pivotally coupled to the main housing 12. The follower 110 includes a shaft 114 and a follower arm 116 coupled to the shaft 114 and aligned with the tether 14 and the cavity defined by the tether wheel 48. The follower arm 116 is pivotable relative to the main housing 12 and the tether wheel 48 between a radially outward position and a radially inward position. A spring 118 is coupled to the follower arm 110 and the main housing 12 and biases the follower arm 110 toward the radially inward position to follow the diameter of the tether 14 as the tether 14 is being extended out of the main housing 12 or retracted into the main housing 12. The follower arm 110 may also apply a slight compressive force against the tether 14 to keep the tether 14 neatly wound against the tether wheel 48. In this regard, as the tether 14 is let out of the tether wheel 48, an outer diameter defined by the wrapped tether 14 on the tether wheel 48 decreases, which causes the follower arm 110 to pivot toward the radially inward position. Conversely, as the tether 14 is retracted in to the tether wheel 48, the outer diameter defined by the tether 14 increases, which causes the follower arm 110 to pivot toward the radially outward position. As such, the follower arm "follows" the increasing or decreasing diameter of the tether 14 as the tether 14 is extended or retracted relative to the tether wheel 48.

Figure 9:
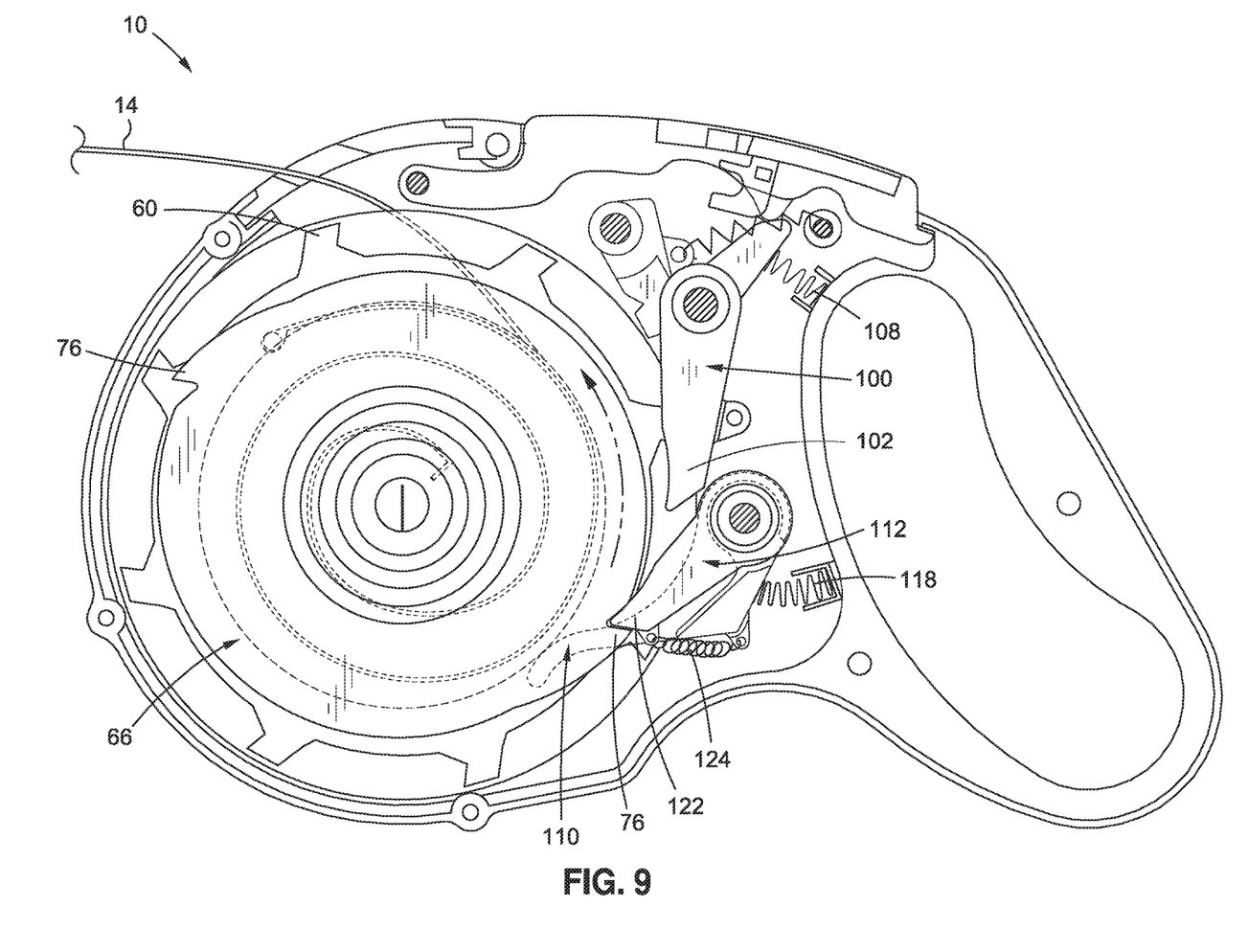
FIG. 9 is a cross sectional view of the leash, with a follower pawl engaged with the soft stop gear.

The follower 110 is operatively coupled to a follower pawl 112, which includes a shaft 120 and a pawl arm 122 coupled to the shaft 120, and is pivotally coupled to the main housing 12. The follower pawl 112 is pivotable between an engaged position, wherein the pawl arm 122 is engaged and pulled into a tooth 76 on the soft stop gear 66, and a disengaged position, wherein the pawl arm 122 is disengaged from the teeth 76 on the soft stop gear 66. A spring 124 also is coupled to the follower 110 and the follower pawl 112.

As the tether 14 is being let out, and the outer diameter of the tether 14 on the tether wheel 48 decreases, the follower 110 is transitioned toward the radially inward position and brings the follower pawl 112 toward the engaged position. As the soft stop gear rotates, a tooth 76 on the soft stop gear 66 will eventually engage with the follower pawl 112 to stop the soft stop gear 66 and actuate the dampening spring 78 to increase the tension in the tether 14 when the tether 14 is nearly fully extended from the tether wheel 48. Thus, instead of having a hard stop when the tether 14 is fully extended, the leash 10 is configured to automatically generate a soft stop when the tether 14 is fully extended.

As the tether 14 is retracted back into the main housing 12, and begins to wrap around the tether wheel 48, the outer diameter of the tether 14 on the tether wheel 48 increases, thereby transitioning the follower 110 toward the radially outward position, which causes the follower pawl 112 to transition back to the disengaged position. According to one embodiment, the follower pawl 112 transitions from the engaged position toward the disengaged position in less than half of a rotation of the soft stop gear 66 during retraction of the tether 14.

With the basic structure of the leash 10 described above, the following will explain an exemplary use of the leash 10. A human user grips the leash via the handle, and holds the main housing 12, while an end portion of the tether 14 is connected to a collar or similar structure on the dog. As the dog moves relative to the user, the length of the tether 14 may continually adjust in a manner corresponding to the changing distance between the dog and the user.

If a situation arises where the user wants to restrict further distance between the user and the dog, the user can actuate one of the two levers 44, 46 on the leash 10. In many instances, the user may want to implement a gentle stopping of the leash extension at a particular length and lock the actuator into position, and thus, the user may press down on the soft stop lever 46, which will cause the soft stop pawl 100 to transition from the disengaged position to the engaged position, as shown in FIG. 8. Accordingly, as the soft stop gear 66 rotates in the direction associated with extension of the tether 14, at least one tooth 76 on the soft stop gear 66 will engage with soft stop pawl 100, which stops the rotation of the soft stop gear 66 relative to the main housing 12. However, the tether wheel 48 remains capable of rotating, although the dampening spring 78 imparts a counteracting force on the tether wheel 48. As such, the extension of the tether 14 will be gently brought to a stop when the counteracting forces on the tether wheel 48, i.e., the pulling force applied by the dog onto the tether 14 and the counteracting force applied by the dampening spring 78, are equal.

However, if a situation arises where the user wants to create a more abrupt stopping of the extension, such as in an emergency condition, e.g., dog running into traffic or to prevent interaction with other potentially aggressive dogs/animals, the user can actuate the hard stop lever 44, as shown in FIG. 7B. Actuation of the hard stop lever 44 causes the hard stop pawl 90 to transition from the disengaged position to the engaged position, which brings the hard stop pawl 90 into the rotational path of the teeth 60 on the hard stop gears 56, 58, such that the teeth 60 will engage with the hard stop pawl 90 and cease rotation of the hard stop gears 56, 58, as well as the tether wheel 48 relative to the main housing 12, which stops further extension of the tether 14.

When the user wants to allow extension of the tether 14, the user releases whichever one of the levers 44, 46 he is pressing, which in turn, allows the tether wheel to freely rotate until the tether reaches full extension. In particular, as the tether 14 is extended, the follower 110 transitions from its radially outward position toward its radially inward position. As the tether 14 approaches full extension, and correspondingly, as the follower 110 approaches the radially inward position, the interconnection between the follower 110 and the follower pawl 112 causes the follower pawl to transition to the engaged configuration to engage with a soft stop gear tooth 76, as shown in FIG. 9, to provide a soft, gentle stop as the tether 14 approaches full extension. As the tether 14 begins retracting back around the tether wheel 48 from the fully extended position, the follower 110 begins transitioning toward the radially outward position, which causes the follower pawl 112 to transition to the disengaged configuration.

Although the foregoing describes the leash 10 as a "dog leash" it is understood that use of the leash 10 is not limited to dogs. In particular, the leash 10 is a generic pet leash which can be used with other pets or animals.

The particulars shown herein are by way of example only for purposes of illustrative discussion, and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A retractable leash for a pet, the retractable leash comprising:
   a main housing defining an enclosure;
   a tether selectively extendable from the main housing in a first operational mode and retractable into the main housing in a second operational mode; and
   a reel assembly coupled to the main housing and located within the enclosure, the reel assembly comprising:
      a tether wheel coupled to the tether, and rotatable relative to the main housing in a first rotational direction to effectuate extension of the tether, and rotatable in a second rotational direction to effectuate retraction of the tether;
      a hard stop gear coupled to the tether wheel;
      a soft stop gear rotatably coupled to the hard stop gear;
      a dampening spring coupled to the soft stop gear and the hard stop gear, the dampening spring imparting a biasing force on the soft stop gear in response to rotation of the soft stop gear relative to the hard stop gear; and
      a follower connected to the main housing, the follower being structured and positioned to interface with the tether, the follower being moveable relative to the main housing in response to extension and retraction of the tether relative to the main housing.

2. The retractable leash recited in claim 1, wherein the soft stop gear is mounted to the hard stop gear, at least a portion of the hard stop gear being located between the soft stop gear and the tether wheel.

3. The retractable leash recited in claim 2, wherein the hard stop gear includes a first set of teeth and the soft stop gear includes a second set of teeth fewer in number than the first set of teeth.

4. The retractable leash recited in claim 1, further comprising a soft stop pawl selectively transitional relative to the soft stop gear between a first position and a second position, the soft stop pawl being disengaged with the soft stop gear in the first position and engaged with the soft stop gear in the second position to restrict rotation of the soft stop gear relative to the main housing.

5. The retractable leash recited in claim 4, further comprising as soft stop lever connected to the main housing and operatively associated with the soft stop pawl, movement of the soft stop lever relative to the main housing facilitating movement of the soft stop pawl between the first position and the second position.

6. The retractable leash recited in claim 4, further comprising a spring coupled to the soft stop pawl and operative to bias the soft stop pawl toward the first position.

7. The retractable leash recited in claim 1, further comprising a hard stop pawl selectively transitional relative to the hard stop gear between a first position and a second position, the hard stop pawl being disengaged with the hard stop gear in the first position and engaged with the hard stop gear in the second positions to restrict rotation of the hard stop gear relative to the main housing.

8. The retractable leash recited in claim 7, further comprising a hard stop lever connected to the main housing and operatively associated with the hard stop pawl, movement of the hard stop lever relative to the main housing facilitating movement of the hard stop pawl between the first position and the second position.

9. The retractable leash recited in claim 7, further comprising a spring coupled to the hard stop pawl and operative to bias the hard stop pawl toward the first position.

10. The retractable leash recited in claim 1, further comprising a retraction spring coupled to the main housing and the tether wheel to impart a biasing force on the tether wheel in response to rotation of the tether wheel in the first rotational direction.

11. The retractable leash recited in claim 1, further comprising a follower pawl operatively coupled to the follower, the follower pawl being transitional between a first position, wherein the follower pawl is engaged with the soft stop gear, and a second position, wherein the follower pawl is disengaged with the soft stop gear, the follower pawl transitioning between the first position and the second position based upon a position of the follower relative to the main housing.

12. The retractable leash recited in claim 11, further comprising a spring extending between the follower and the follower pawl.

13. A retractable leash comprising:
   a housing;
   a tether extendable from the housing in a first operational mode and retractable toward the housing in a second operational mode;
   a tether wheel coupled to the tether, and rotatable relative to the housing in a first rotational direction to effectuate extension of the tether, and rotatable in a second rotational direction to effectuate retraction of the tether;
   a set of hard stop teeth coupled to the tether wheel;
   a set of soft stop teeth moveably coupled to the set of hard stop teeth;
   a dampening spring coupled to the soft stop teeth and the hard stop teeth, the dampening spring imparting a biasing force on the soft stop teeth in response to movement of the set of soft stop teeth relative to the set of hard stop teeth; and
   a follower connected to the housing, the follower being structured and positioned to interface with the tether, the follower being moveable relative to the housing in response to extension and retraction of the tether relative to the housing.

14. The retractable leash recited in claim 13, further comprising a soft stop pawl selectively transitional relative to the set of soft stop teeth between a first position and a second position, the soft stop pawl being disengaged with the set of soft stop teeth in the first position and engaged with at least one of the set of soft stop teeth in the second position to restrict movement of the set of soft stop teeth relative to the housing.

15. The retractable leash recited in claim 13, further comprising a hard stop pawl selectively transitional relative to the set of hard stop teeth between a first position and a second position, the hard stop pawl being disengaged with the set of hard stop teeth in the first position and engaged with at least one of the hard stop teeth in the second position to restrict, rotation of the set of hard stop teeth relative to the housing.

16. The retractable leash recited in claim 13, further comprising a retraction spring coupled to the housing and the tether wheel to impart a biasing force on the tether wheel in response to rotation of the tether wheel in the first rotational direction.

17. The retractable leash recited in claim 13, further comprising a follower pawl operatively coupled to the follower, the follower pawl being transitional between a first position, wherein the follower pawl is engaged with the set of soft stop teeth, and a second position, wherein the follower pawl is disengaged with the set of soft stop teeth, the follower pawl transitioning between the first position and the second position based upon a position of the follower relative to the housing.

18. The retractable leash recited in claim 17, further comprising a spring extending between the follower and the follower pawl.

* * * * *